United States Patent
Lee

(10) Patent No.: US 12,202,555 B2
(45) Date of Patent: Jan. 21, 2025

(54) STEERING CONTROL APPARATUS AND STEERING CONTROL METHOD

(71) Applicant: HL MANDO CORPORATION, Gyeonggi-do (KR)

(72) Inventor: Jung Ae Lee, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 325 days.

(21) Appl. No.: 17/777,017

(22) PCT Filed: Nov. 18, 2020

(86) PCT No.: PCT/KR2020/016220
§ 371 (c)(1),
(2) Date: May 14, 2022

(87) PCT Pub. No.: WO2021/101226
PCT Pub. Date: May 27, 2021

(65) Prior Publication Data
US 2022/0396308 A1 Dec. 15, 2022

(30) Foreign Application Priority Data
Nov. 18, 2019 (KR) .................. 10-2019-0147906

(51) Int. Cl.
*B62D 5/04* (2006.01)
(52) U.S. Cl.
CPC ......... *B62D 5/0484* (2013.01); *B62D 5/0463* (2013.01); *B62D 5/0493* (2013.01)
(58) Field of Classification Search
None
See application file for complete search history.

(56) References Cited

U.S. PATENT DOCUMENTS

| 2010/0147618 A1 | 6/2010 | Osonoi et al. |
| 2011/0218704 A1* | 9/2011 | Kanekawa ............. B62D 5/049 701/29.2 |

(Continued)

FOREIGN PATENT DOCUMENTS

| CN | 106029471 | 10/2016 |
| EP | 1 040 983 | 10/2000 |

(Continued)

OTHER PUBLICATIONS

International Search Report for PCT/KR2020/016220 mailed on Feb. 22, 2021 (now published as WO 2021/101226) with English translation provided by WIPO.

(Continued)

*Primary Examiner* — James J Lee
*Assistant Examiner* — Wenyuan Yang
(74) *Attorney, Agent, or Firm* — WOMBLE BOND DICKINSON (US) LLP

(57) ABSTRACT

The present disclosure provides a steering control apparatus comprising: a first control unit for controlling a motor to supply a motor torque associated with steering on the basis of a value of a first steering torque; and a second control unit for mutually monitoring operation states with the first control unit via a communication interface and, when an abnormality occurs in the first control unit, controlling the motor, wherein, when the occurrence of an abnormality associated with the operation state of the first control unit is recognized, the second control unit determines whether or not the first control unit or the communication unit is abnormal, on the basis of a value of a second steering torque. According to the present disclosure, a redundant safety mechanism can be implemented without a separate change in a hardware design.

17 Claims, 10 Drawing Sheets

(56) References Cited

U.S. PATENT DOCUMENTS

| | | |
|---|---|---|
| 2016/0207479 A1 | 7/2016 | Rockwell et al. |
| 2017/0015348 A1* | 1/2017 | Sasaki .................... B62D 6/00 |
| 2018/0237055 A1 | 8/2018 | Keum et al. |
| 2019/0193774 A1* | 6/2019 | Nakada .................. B62D 5/049 |
| 2019/0233002 A1 | 8/2019 | Osamu |
| 2019/0270478 A1 | 9/2019 | Kim |
| 2019/0359253 A1* | 11/2019 | Kuramitsu ........... B62D 5/0481 |

FOREIGN PATENT DOCUMENTS

| | | | |
|---|---|---|---|
| JP | 5805255 | 11/2015 | |
| JP | 2017-100673 | 6/2017 | |
| JP | 2018-034676 | 3/2018 | |
| JP | 2018-139480 | 9/2018 | |
| JP | 2018139480 A * | 9/2018 | ............ B60R 16/02 |
| KR | 10-2006-0045221 | 5/2006 | |
| KR | 10-2019-0096053 | 8/2019 | |
| WO | 2018/042729 | 3/2018 | |

OTHER PUBLICATIONS

Written Opinion of the International Searching Authority for PCT/KR2020/016220 mailed on Feb. 22, 2021 (now published as WO 2021/101226) with English translation provided by Google Translate.

Office Action dated Dec. 15, 2023 for Chinese Patent Application No. 202080081258.2 and its English translation from Global Dossier.

Tao Siqi et al.; "A New Control Strategy to Reduce Steering Torque for Vehicles Equipped With Electric Power Steering", Changan University, ShaanXi Xi'an, 2012 No. 6.

Notice of Allowance dated May 7, 2024 for Chinese Patent Application No. 202080081258.2 and its English translation by Google Translate.

* cited by examiner

STEERING CONTROL APPARATUS AND STEERING CONTROL METHOD

CROSS-REFERENCE TO RELATED APPLICATIONS

This application is the national stage of International Patent Application No. PCT/KR2020/016220 filed on Nov. 18, 2020, which claims priority to Korean Patent Application No. 10-2019-0147906 filed in the Korean Intellectual Property Office on Nov. 18, 2019, the disclosure of which is incorporated by reference herein in its entirety.

TECHNICAL FIELD

The disclosure relates to a steering control device and a steering control method capable of performing steering control when a failure in the steering control device is detected.

BACKGROUND ART

Power steering of a vehicle is a powered steering device and serves to assist the driver in manipulating the steering wheel. Power steering has mainly adopted methods using hydraulic pressure, but use of electric power steering (EPS) systems which use motor power is recently increasing. As compared with conventional hydraulic pressure power steering systems, electric power steering systems have the merits of being lightweight, occupying a reduced space, and no need for oil change.

Such an electric power steering system includes a torque sensor that detects the steering torque generated by the turning of the steering wheel to output an electrical signal proportional to the steering torque, an electronic control unit (ECU) that receives the electrical signal from the torque sensor and outputs a motor driving signal, and a steering motor that generates assist torque based on the motor driving signal output from the ECU. The assist torque generated by the steering motor is transferred to the rack, pinion gear, or steering column to assist the driver's steering torque.

In recent years, steer-by-wire (SbW) systems have been developed and applied which perform vehicle steering by controlling the driving of the motor connected to the rack by electrical signals without mechanical connecting devices, such as the pinion shaft, the steering column or universal joint between the steering wheel and the wheel. Such an SbW system may include a steering wheel for the driver's steering manipulation, a reaction force motor installed on one side of the steering wheel to provide reaction force torque according to the turn of the steering wheel, an actuator connected to the rack to implement steering manipulation, an angular sensor for detecting the steering angle, vehicle speed, and torque of the steering wheel, and an ECU for driving the actuator and the reaction force motor according to the electrical signal inputted from the sensor.

Meanwhile, demand for high safety for vehicles led to introduction of the technology of performing steering control through an assistant ECU further equipped in the electric power steering system when the main ECU has an abnormality. Therefore, an increasing need exists for a method for more safely performing vehicle steering by more precisely detecting, e.g., an abnormality in the main CPU.

DETAILED DESCRIPTION OF THE INVENTION

Technical Problem

In the foregoing background, the disclosure aims to provide a steering control device and steering control method capable of implementing a redundant safety mechanism without a separate hardware design change by determining an abnormality in the communication interface or main controller based on the steering torque value in the assistant controller upon recognizing an abnormality in the main controller provided in the steering control device.

Another object of the disclosure is to provide a steering control device and steering control method capable of saving the costs for providing an additional communication interface by determining an abnormality in the communication interface provided between the assistant controller and the main controller based on the steering torque value by the assistant controller.

Technical Solution

To achieve the foregoing objectives, in an aspect, the disclosure may provide a steering control device comprising a sensor unit including a first torque sensor and a second torque sensor each detecting a driver's steering force as a steering torque, a first controller receiving a value of a first steering torque detected from the first torque sensor and controlling a motor to supply steering-related motor torque based on the value of the first steering torque, and a second controller mutually monitoring an operational state through a communication interface with the first controller and controlling the motor when an abnormality occurs in the first controller, wherein when an abnormality related to the operational state of the first controller is recognized as occurring, the second controller receives a value of a second steering torque detected from the second torque sensor and determines whether the communication interface or the first controller has an abnormality based on the value of the second steering torque.

In another aspect, the disclosure may provide a steering control method comprising: controlling a motor to supply a steering-related motor torque based on a value of a first steering torque detected from a first torque sensor, by a first controller, mutually monitoring an operational state through a communication interface by a second controller along with the first controller, receiving a value of a second steering torque detected from a second torque sensor if an abnormality related to the operational state of the first controller is recognized as occurring, by the second controller, and determining whether the first controller or the communication interface has an abnormality based on the value of the second steering torque by the second controller.

Advantageous Effects

As described above, according to the disclosure, there may be provided a steering control device and steering control method capable of implementing a redundant safety mechanism without a separate hardware design change by determining an abnormality in the communication interface or main controller based on the steering torque value in the assistant controller upon recognizing an abnormality in the main controller provided in the steering control device.

Further, according to the disclosure, there may be provided a steering control device and steering control method capable of saving the costs for providing an additional communication interface by determining an abnormality in the communication interface provided between the assistant controller and the main controller based on the steering torque value by the assistant controller.

MODE FOR CARRYING OUT THE INVENTION

Figure 1:
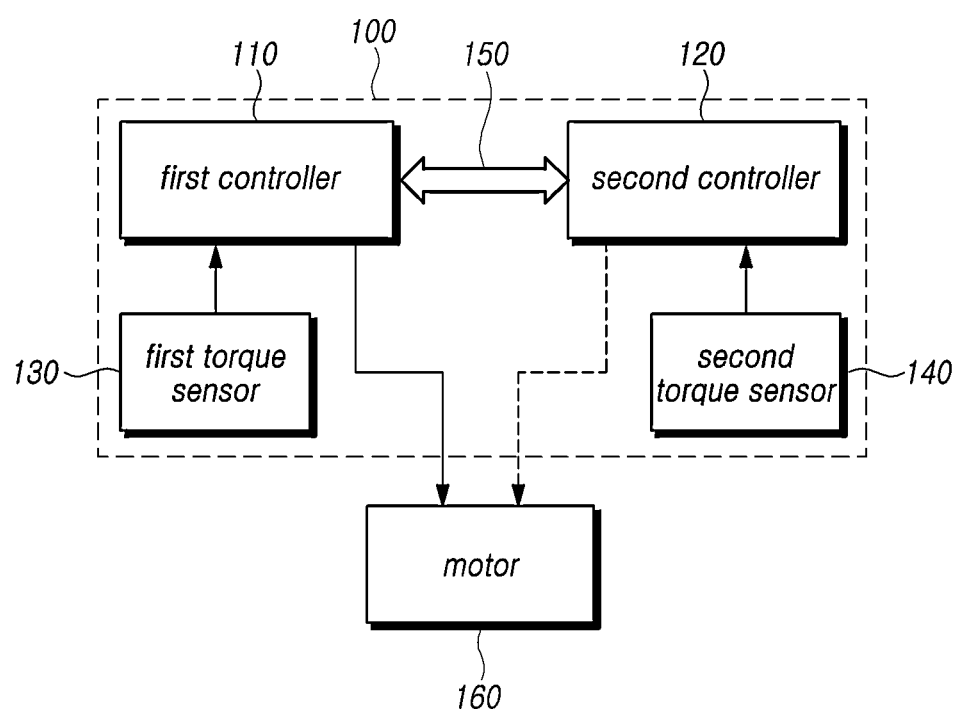
FIG. 1 is a block diagram illustrating a steering control device according to an embodiment of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When a component is described as "connected," "coupled," or "linked" to another component, the component may be directly connected or linked to the other component, but it should also be appreciated that other components may be "connected," "coupled," or "linked" between the components.

Unless defined otherwise, all the terms (including technical and scientific terms) used herein may be construed as commonly appreciated by one of ordinary skill in the art to which the present invention pertains. Further, terms defined in a dictionary commonly used are not ideally or overly interpreted unless defined expressly or specifically. The terms described below are defined considering the functions in embodiments of the present disclosure and may be replaced with other terms according to the intention or practice of the user or operator. Therefore, the terms should be defined based on the overall disclosure.

Hereinafter, a steering control device and steering control method according to embodiments of the disclosure are described with reference to the accompanying drawings.

FIG. 1 is a block diagram illustrating a steering control device according to an embodiment of the disclosure.

Referring to FIG. 1, a steering control device 100 according to the disclosure may include a sensor unit including a first torque sensor 130 and a second torque sensor 140 each detecting a driver's steering force as a steering torque, a first controller 110 receiving a value of a first steering torque detected from the first torque sensor and controlling a motor to supply steering-related motor torque based on the value of the first steering torque, and a second controller 120 mutually monitoring an operational state through a communication interface 150 with the first controller and controlling the motor when an abnormality occurs in the first controller.

The sensor unit may include the first torque sensor 130 and the second torque sensor 140. Further, the sensor unit may further include various sensors for detecting information related to the vehicle, such as a vehicle speed sensor and a steering angle sensor.

The first torque sensor 130 may detect the steering force applied by the driver through the steering wheel as a steering torque. The first torque sensor 130 may input the detected value of the first steering torque to the first controller 110. The second torque sensor 140 may detect the steering force applied by the driver through the steering wheel as a steering torque. The second torque sensor 140 may input the detected value of the second steering torque to the second controller 120.

According to an example, the first torque sensor 130 and the second torque sensor 140 may detect steering torque by the driver independently of each other. Further, the first torque sensor 130 and the second torque sensor 140 may transmit steering torque information to the first controller 110 and the second controller 120, respectively, through separate interface paths.

The first controller 110 may be implemented as an electronic control unit (ECU) including, e.g., an input/output interface circuit exchanging information with an external device provided in the vehicle, such as a torque sensor, a micro-controller (MCU) controlling the motor while feedback-controlling the motor current based on input information, and a motor detection circuit detecting the motor current supplied to the motor. The first controller 110 is a main ECU, and as shown by the solid line in FIG. 1, may normally control the motor 160 in an active state.

The first controller 110 may control the overall operation of the steering assist system provided in the vehicle. According to an example, the steering assist system may include EPS or SbW but is not limited by its name or type as long as it is capable of steering control under the control of the first controller 110.

The first controller 110 may receive steering torque information detected by the first torque sensor 130. The first controller 110 may control the motor 160 to supply a motor torque related to steering based on the input steering torque information, vehicle speed information, and motor current information supplied to the motor. According to an example, assist torque or reaction force torque based on the driver's steering torque may correspond to the steering-related motor torque.

The second controller 120 may be implemented as an ECU including, e.g., an input/output interface circuit exchanging information with an external device provided in the vehicle, such as a torque sensor, a micro-controller (MCU) controlling the motor while feedback-controlling the motor current based on input information, and a motor detection circuit detecting the motor current supplied to the motor. The second controller 120 is an assistant ECU and, as shown by the dashed line in FIG. 2, may normally control the motor 160 in a standby state.

When an abnormality occurs in the first controller 110 and the steering assist system does not operate normally, the second controller 120 may control the steering assist system on behalf of the first controller 110. To that end, the second controller 120 may mutually monitor the operational state of the first controller 110 through the communication interface 150 provided between the second controller 110 and the first controller 110.

The communication interface 150 may be established between the first controller 110 and the second controller 120 and be used for mutual signal transmission and reception. According to an example, the communication interface 150 may be implemented as a CAN interface. However, this is an example and, without limited thereto, the communication interface 150 is not limited by its type or name as long as it is an independent communication interface available for transmission/reception between the first controller 110 and the second controller 120.

According to an example, the first controller 110 and the second controller 120 may be configured to transmit and receive signals representing each other's operational state information to/from each other at a predetermined period through the communication interface 150. According to another example, each of the first controller 110 and the second controller 120 may be configured to monitor whether a normal operation is performed based on whether a signal output from a specific terminal of the counterpart is detected. Further, the monitoring method is not limited to a specific method as long as it is able to monitor the operational state between the controllers.

Upon failing to receive a signal indicating operational state information or receiving a signal indicating an abnormality occurrence from the first controller 110, the second controller 120 may recognize that an abnormality related to the operational state of the first controller 110 occurs. However, not only when an abnormality occurs in the first controller 110 itself but when an abnormality occurs in the communication interface 150 provided between the first controller 110 and the second controller 120 as well, the second controller 120 may recognize that an abnormality related to the operational state of the first controller 110 occurs.

For example, it is assumed that as it is recognized that an abnormality related to the operational state of the first controller 110 occurs, the second controller 120 switches to the active state. If an abnormality occurs in the first controller 110, the motor 160 may be controlled under the control of the second controller 120, and steering assist system may be normally operated. In this case, however, if the second controller 120 is not immediately switched to the active state, neither of the controllers controls the motor 160 so that a loss of assist (LOA) state may occur. In contrast, if the first controller 110 is operated in the normal state, and an abnormality occurs in the communication interface 150, such an occasion may occur where the two controllers simultaneously control the motor 160 according to the switch of the second controller 120 to the active state.

In other words, in a case where it is recognized that an abnormality related to the operational state of the first controller 110 occurs, it is required to precisely and quickly identify which one of the first controller 110 and the communication interface 150 the abnormality occurs in. To that end, according to an example the communication interface 150 may be implemented as a dual communication interface constituted of two paths. In other words, signal transmission/reception is performed normally through the main communication interface and, upon recognizing an occurrence of an abnormality related to the operational state of the first controller 110, it may be again determined through the assistant communication interface whether an abnormality occurs. However, in this case, since a cost for providing a separate communication interface is added, a method is required for determining which one of the first controller 110 and the communication interface 150 has an abnormality without adding a separate component.

According to an embodiment, upon recognizing an occurrence of an abnormality related to the operational state of the first controller, the second controller 120 may receive the value of the second steering torque detected from the second torque sensor. The second controller 120 may determine whether an abnormality occurs in the first controller 110 or the communication interface 150 based on the received value of the second steering torque.

According to an example, the second torque sensor may be configured to transmit the value of the second steering torque to the second controller 120 at the request of the second controller 120. Or, according to another example, the second torque sensor may be configured to transmit the value of the second torque sensor to the second controller 120 according to a predetermined period. Or, according to another example, the second torque sensor may be configured to continuously transmit the value of the second steering torque to the second controller 120.

The main features of the steering assist system, such as EPS, may supply a proper assist torque based on the steering torque by the driver, providing the driver with steering convenience. The required value of the assist torque may be calculated based on the steering torque and vehicle speed, and a rack force may be generated through the motor output according thereto, reducing the steering force for the driver to steer the vehicle.

When an abnormality occurs in the motor or controller of the motor in the steering assist system, the steering assist system may not normally supply assist torque. Accordingly, the driver should apply a larger steering force for steering, so that the torque sensor detects a larger steering torque. Thus, if a steering torque value out of a section determined to be a normal range is detected, the ECU may determine that it is not in the normal state.

In other words, upon failing to receive information about the operational state of the first controller 110 or receiving abnormality occurrence information about the operational state of the first controller 110 through the communication interface 150, the second controller 120 may request second steering torque information from the second torque sensor 140. If the value of the second steering torque falls within the normal range, the second controller 120 may determine that an abnormality occurs in the communication interface 150. If the value of the second steering torque is not within the normal range, the second controller 120 may determine that an abnormality occurs in the first controller 110.

Accordingly, it is possible to implement a redundant safety mechanism without a separate hardware design change by determining an abnormality in the communication interface or main controller based on the steering torque value in the assistant controller upon recognizing an abnormality in the main controller provided in the steering control device and to save costs for an additional communication interface.

The operation of the steering control device 100 is described below in more detail with reference to the related drawings.

Figure 2:
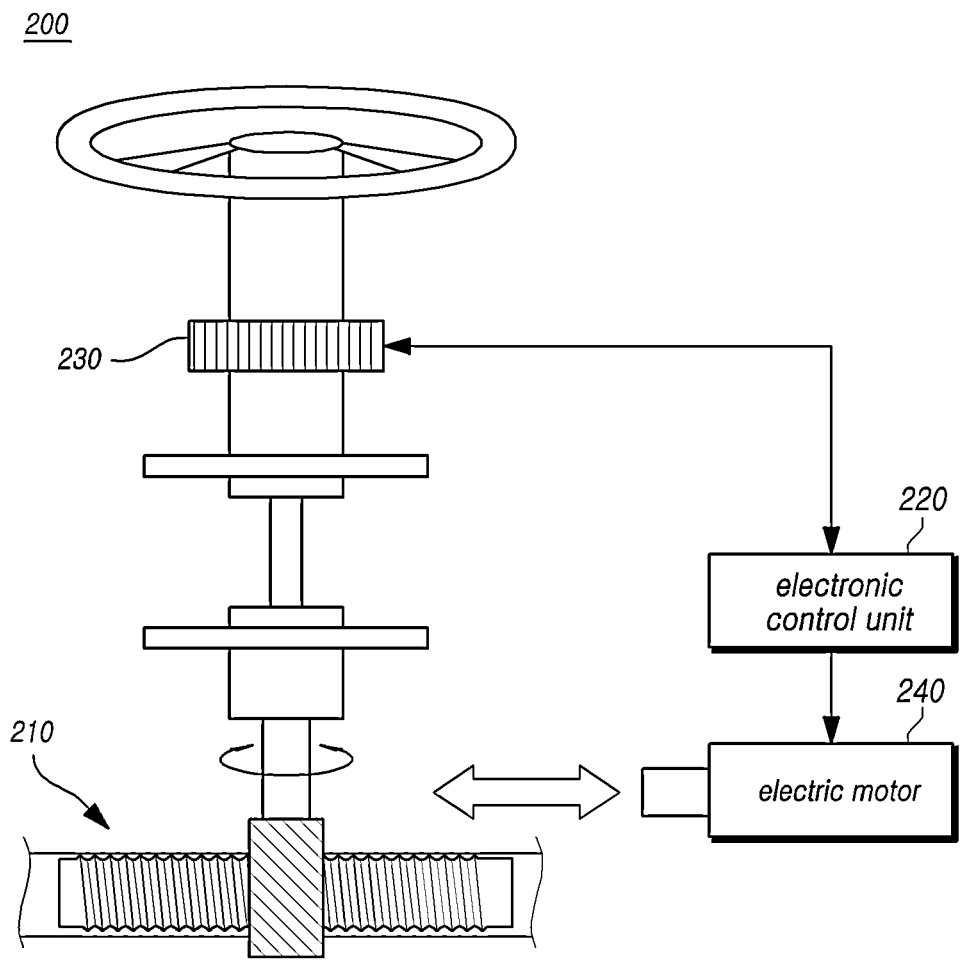
FIGS. 2 and 3 are views schematically illustrating a steering assist system according to an embodiment of the disclosure.
Figure 3:
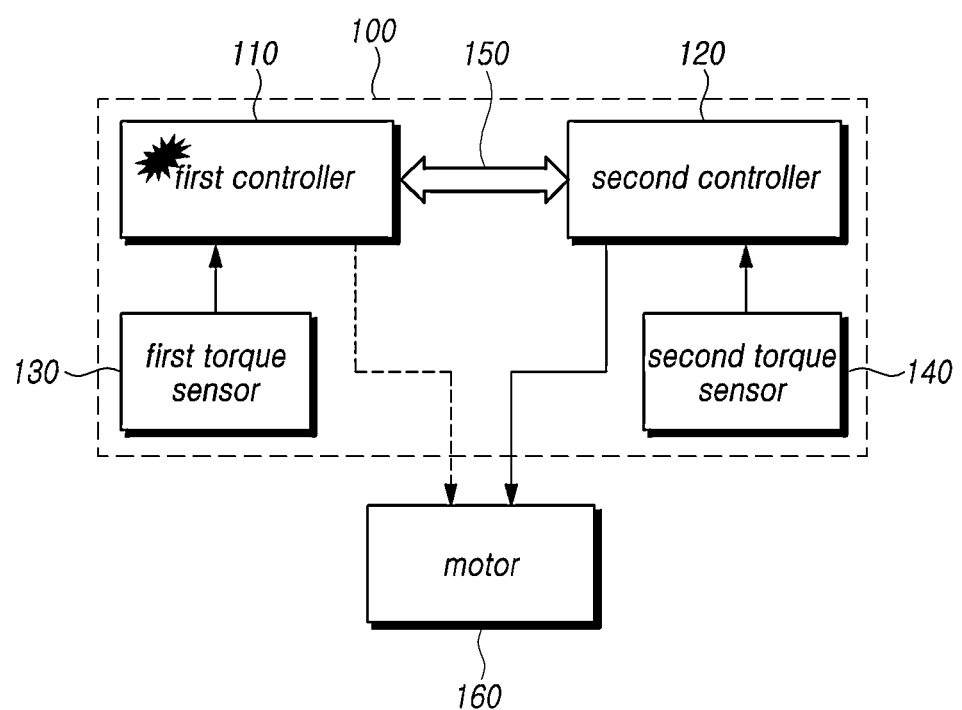
Figure 4:
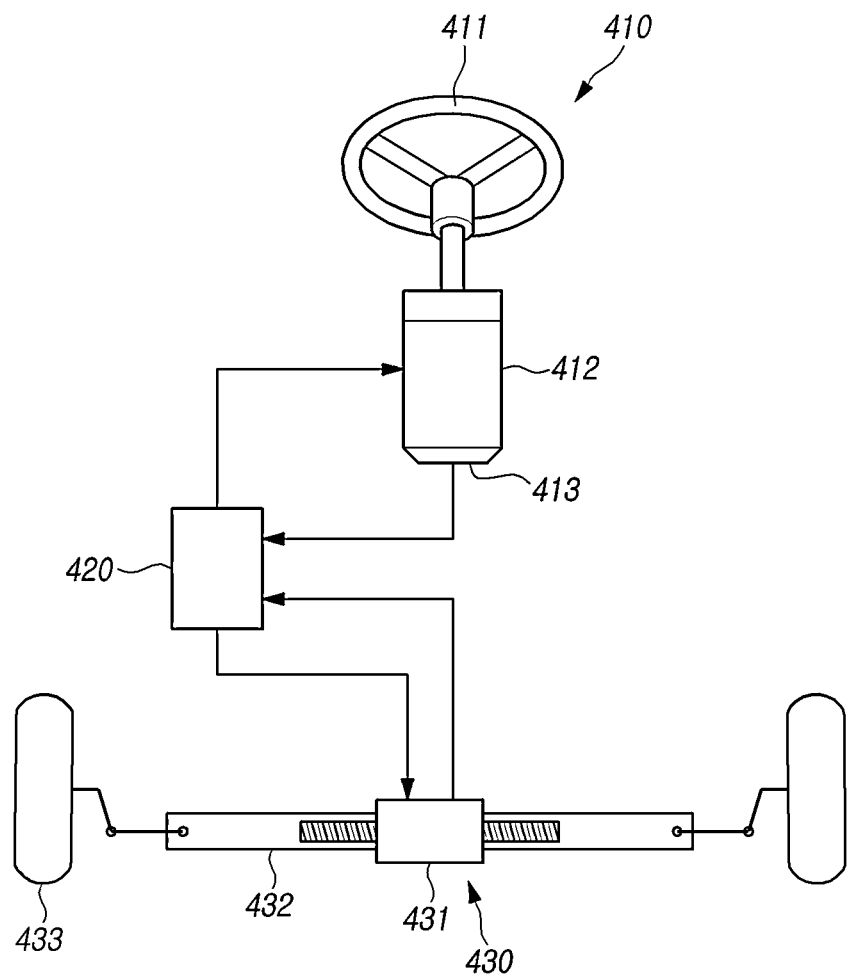
FIGS. 4 and 5 are views illustrating operations when an abnormality occurs in a main controller or a communication interface according to an embodiment of the disclosure.
Figure 5:
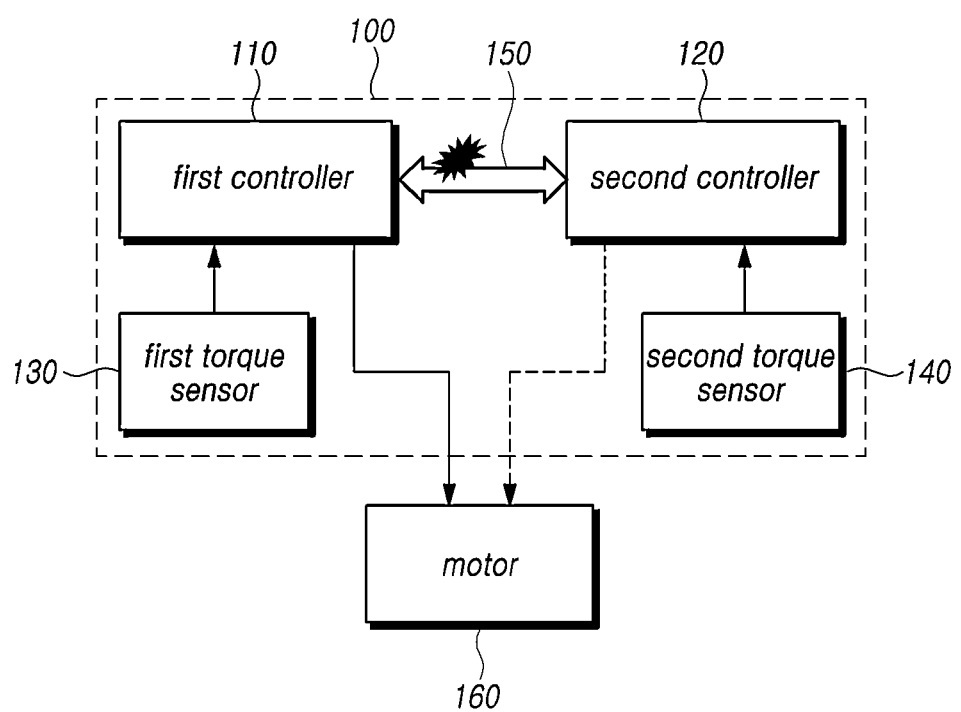

FIGS. 2 and 3 are views schematically illustrating a steering assist system according to an embodiment of the disclosure. FIGS. 4 and 5 are views illustrating operations when an abnormality occurs in a main controller or a communication interface according to an embodiment of the disclosure.

The steering assist system to which embodiments of the disclosure are applicable means a system that assists the steering force for the driver to easily steer in the manual driving mode and steers the host vehicle even without the driver's manipulation in the autonomous driving mode. The steering assist system may be divided into a mechanical steering assist system and a steer-by-wire system depending on whether the steering wheel through the wheels are linked through a mechanical connecting member.

FIG. 2 schematically illustrates a configuration of a mechanical steering assist system to which embodiments of the disclosure are applicable. The mechanical steering assist system 200 includes a rack and pinion gear 210, a torque sensor 220, an electronic control unit 230, and an electric motor 240.

The rack and pinion gear 210 includes a pinion gear, a rack gear, and a meshing portion in which the pinion gear and the rack gear are meshed to each other. As the pinion gear is rotated, the rack gear makes a linear motion. Here, the movement of the meshing portion from one end to the other end of the rack gear is referred to as a rack stroke.

The torque sensor 220 is disposed on the input shaft of the steering shaft, detects the steering torque according to the rotation of the driver's steering wheel, generates detected steering torque information, and transmits the steering torque information to the electronic control unit 230.

The electronic control unit 230 receives information necessary for steering control from a plurality of sensors including the torque sensor 220, generates a motor control current considering the received information, and controls the driving direction and driving force of the motor 240.

FIG. 3 schematically illustrates a configuration of an electric power steering system to which embodiments of the disclosure are applicable.

FIG. 3 schematically illustrates a configuration of a steer-by-wire system to which embodiments of the disclosure are applicable. The steer-by-wire system 300 may include a steering input actuator 310, an electronic control unit 320, and a steering output actuator 330. As described above, in the steer-by-wire system 300, the steering input actuator 310 and the steering output actuator 330 are mechanically separated from each other.

The steering input actuator 310 may mean a device to which steering information intended by the driver is inputted. As described above, the steering input actuator 310 may include a steering wheel 311, a steering shaft 312, and a reaction force motor 313 and may further include a steering angle sensor or a torque sensor.

The reaction force motor 313 may receive a control signal from the electronic control unit 320 and impart a reaction force to the steering wheel 311. Specifically, the reaction force motor 313 may receive a command current from the electronic control unit 320 and drive at a rotation speed indicated by the command current, generating reaction torque.

The electronic control unit 320 may receive steering information from the steering input actuator 310, calculate a control value, and output an electrical signal indicating the control value to the steering output actuator 330. Here, the steering information may include a steering angle and a steering torque.

Meanwhile, the electronic control unit 320 may receive, as feedback, power information actually output from the steering output actuator 330, calculate a control value, and output an electrical signal indicating the control value to the steering input actuator 310, providing the driver with a steering sensation (steering feeling).

The steering output actuator 330 may include a steering motor 331, a rack 332, a wheel 333, and the like, and may further include a vehicle speed sensor, a rack position sensor, and the like.

The steering motor 331 may axially move the rack 332. Specifically, the steering motor 331 may receive a command current from the electronic control unit 320 and thus drive, and may allow the rack 332 to linearly move in the axial direction.

As driven by the steering motor 331, the rack 332 may perform a linear motion which allows the wheel 333 to turn to the left or right.

The steering assist system may further include, e.g., a clutch (not shown) for separating or connecting the steering input actuator 310 and the steering output actuator 330. The clutch may be operated by the control of the electronic control unit 320.

Hereinafter, an embodiment according to the disclosure will be first described based on the mechanical steering assist system shown in FIG. 2.

When the steering assist system is a mechanical steering assist system, the motor 160 may correspond to a steering motor that supplies assist torque based on the driver's steering torque.

The second controller 120 may monitor the operational state of the first controller 110 through the communication interface 150 provided between the second controller 110 and the first controller 110. Upon failing to receive a signal indicating operational state information or receiving a signal indicating an abnormality occurrence from the first controller 110, the second controller 120 may recognize that an abnormality related to the operational state of the first controller 110 occurs.

Upon recognizing an occurrence of an abnormality related to the operational state of the first controller 110, the second controller 120 may receive the value of the second steering torque detected from the second torque sensor 140. If the value of the second steering torque exceeds a first reference value, the second controller 120 may determine that an abnormality occurs in the first controller 110. This is because, as described above, the assist torque by the steering motor 160 is not properly supplied.

According to an example, the first reference value may be set to a boundary value indicating a range of steering torque that may be detected when the motor 160 is normally controlled to supply an appropriate assist torque. In this case, since the steering direction may have a positive direction and a negative direction with respect to the neutral position, the absolute value of the maximum value of the steering torque that may appear in the normal state may be set as the first reference value. Accordingly, the absolute value of the second steering torque value may be compared with the first reference value.

However, in the normal state, if the positive maximum value of the steering torque differs from the negative maximum value, the first reference value may be set to a positive maximum value and a negative maximum value. In this case, if the value of the second steering torque is detected as a value out of the steering torque range having the first reference value as the boundary, the second controller 120 may determine that an abnormality occurs in the first controller 110 as shown in FIG. 4.

In this case, the second controller 120 may switch the standby state to the active state. The second controller 120 may control the motor 160 as shown by the solid line in FIG. 4, using the second steering torque value and other information received from the second torque sensor 140. Accordingly, if an abnormality occurs in the first controller 110, the second controller 120 may precisely detect the occurrence of the abnormality and control the motor 160 to supply assist torque quickly without occurrence of LOA.

According to an example, the second controller 120 may control the output unit to output an abnormality occurrence notification indicating that the abnormality occurs in the first controller 110. The output unit may include a display providing visual information, a sound output unit providing audible information, or a haptic module providing tactile information. The output unit may output the abnormality occurrence notification for the first controller 110 according to a predetermined setting.

If the value of the second steering torque is the first reference value or less, the second controller 120 may determine that an abnormality occurs in the communication interface 150. This is because, as described above, the assist torque by the steering motor 160 is properly supplied so that the steering torque by the driver does not exceed the normal range. In other words, even when the steering motor 160 normally supplies assist torque, since the occurrence of the abnormality related to the operational state of the first controller 110 is recognized, the communication interface 150 may be determined to have an abnormality as shown in FIG. 5.

In this case, since the first controller 110 is normally operated, the second controller 120 may remain in the standby state as shown by the dashed line in FIG. 5. Accordingly, it is possible to prevent such an occasion where the second controller 120 happens to control the motor 160 even when the communication interface 150 has a failure.

According to an example, the second controller 120 may control the output unit to output an abnormality occurrence notification indicating that the abnormality occurs in the communication interface 150. The output unit may output the abnormality occurrence notification for the communication interface 150 according to a predetermined setting.

According to an example, if it is determined that an abnormality occurs in any one or more of the first controller 110 or the communication interface 150, the second controller 120 may limit the vehicle speed or RPM of the vehicle, determining to drive in the limp home mode for protecting, e.g., the engine and transmission. Accordingly, it is possible to perform safe driving even when an abnormality occurs in any one or more of the first controller 110 or the communication interface 150.

Hereinafter, an embodiment according to the disclosure will be described based on the steer-by-wire system shown in FIG. 3.

When the steering assist system is a steer-by-wire system, the motor 160 may correspond to a reaction force motor that supplies reaction force torque based on the driver's steering torque.

Upon recognizing an occurrence of an abnormality related to the operational state of the first controller 110, the second controller 120 may receive the value of the second steering torque detected from the second torque sensor 140. If the value of the second steering torque is a second reference value or less, the second controller 120 may determine that an abnormality occurs in the first controller 110. This is because the reaction force torque by the reaction force motor 160 is not properly supplied, so that the steering torque required by the driver is reduced.

According to an example, the second reference value may be set to a boundary value indicating a range of steering torque that may be detected when the motor 160 is normally controlled to supply an appropriate reaction force torque. In this case, since the steering direction may have a positive direction and a negative direction with respect to the neutral position, the absolute value of the minimum value of the steering torque that may appear in the normal state may be set as the second reference value. Accordingly, the absolute value of the second steering torque value may be compared with the second reference value.

However, in the normal state, if the positive minimum value of the steering torque differs from the negative minimum value, the second reference value may be set to a positive minimum value and a negative minimum value. In this case, if the value of the second steering torque is detected as a value within the steering torque range having the second reference value as the boundary, the second controller 120 may determine that an abnormality occurs in the first controller 110 as shown in FIG. 4.

In this case, the second controller 120 may switch the standby state to the active state and control the reaction force motor 160. The subsequent operations of the second controller 120 may be performed in substantially the same manner as the above-described mechanical steering assist system absent conflict in the technical spirit, and no detailed description thereof is thus given.

If the value of the second steering torque exceeds the second reference value, the second controller 120 may determine that an abnormality occurs in the communication interface 150. This is because the reaction force torque by the reaction force motor 160 is properly supplied so that the steering torque by the driver falls within the normal range. In other words, even when the reaction force motor 160 normally supplies reaction force torque, since the occurrence of the abnormality related to the operational state of the first controller 110 is recognized, the communication interface 150 may be determined to have an abnormality as shown in FIG. 5.

In this case, since the first controller 110 is normally operated, the second controller 120 may remain in the standby state as shown by the dashed line in FIG. 5. Accordingly, it is possible to prevent such an occasion where the second controller 120 happens to control the motor 160 even when the communication interface 150 has a failure.

According to an example, the second controller 120 may control the output unit to output an abnormality occurrence notification indicating that the abnormality occurs in the communication interface 150. The subsequent operations of the second controller 120 may be performed in substantially the same manner as the above-described mechanical steering assist system absent conflict in the technical spirit, and no detailed description thereof is thus given.

Although such a case has been described above in which an abnormality related to the operational state of the first controller 110 occurs, this may be applied in substantially the same manner even where an abnormality related to the operational state of the second controller 120 occurs. In other words, upon recognizing that an abnormality related to the operational state of the second controller 120 occurs, the first controller 110 may determine which one of the second controller 120 or the communication interface 150 has an abnormality based on the value of the steering torque detected from the first torque sensor 130. However, since the first controller 110 is controlling the motor 160 by the main ECU, the first controller 110 may control the output unit to output an abnormality occurrence notification for the component, where the abnormality occurs, of the second controller 120 or the communication interface 150.

Accordingly, it is possible to implement a redundant safety mechanism without a separate hardware design change by determining an abnormality in the communication interface or main controller based on the steering torque value in the assistant controller upon recognizing an abnormality in the main controller provided in the steering control device and to save costs for an additional communication interface.

Figure 6:
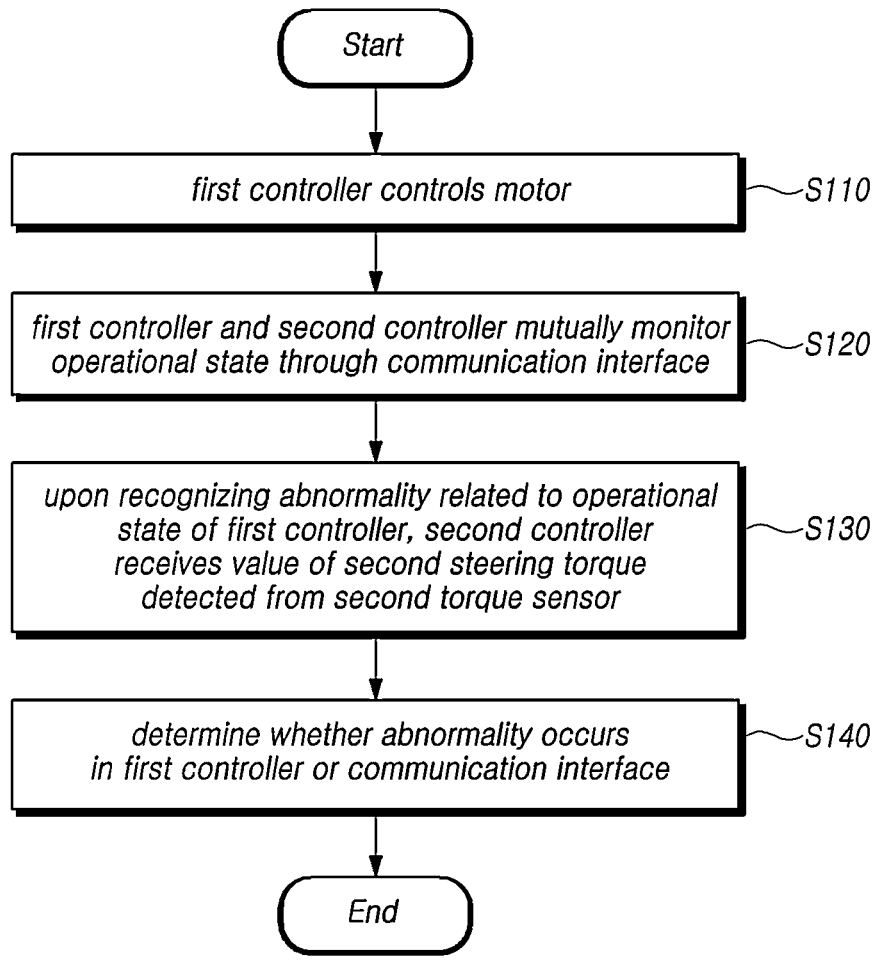
FIG. 6 is a flowchart illustrating a steering control method according to an embodiment of the disclosure.
Figure 7:
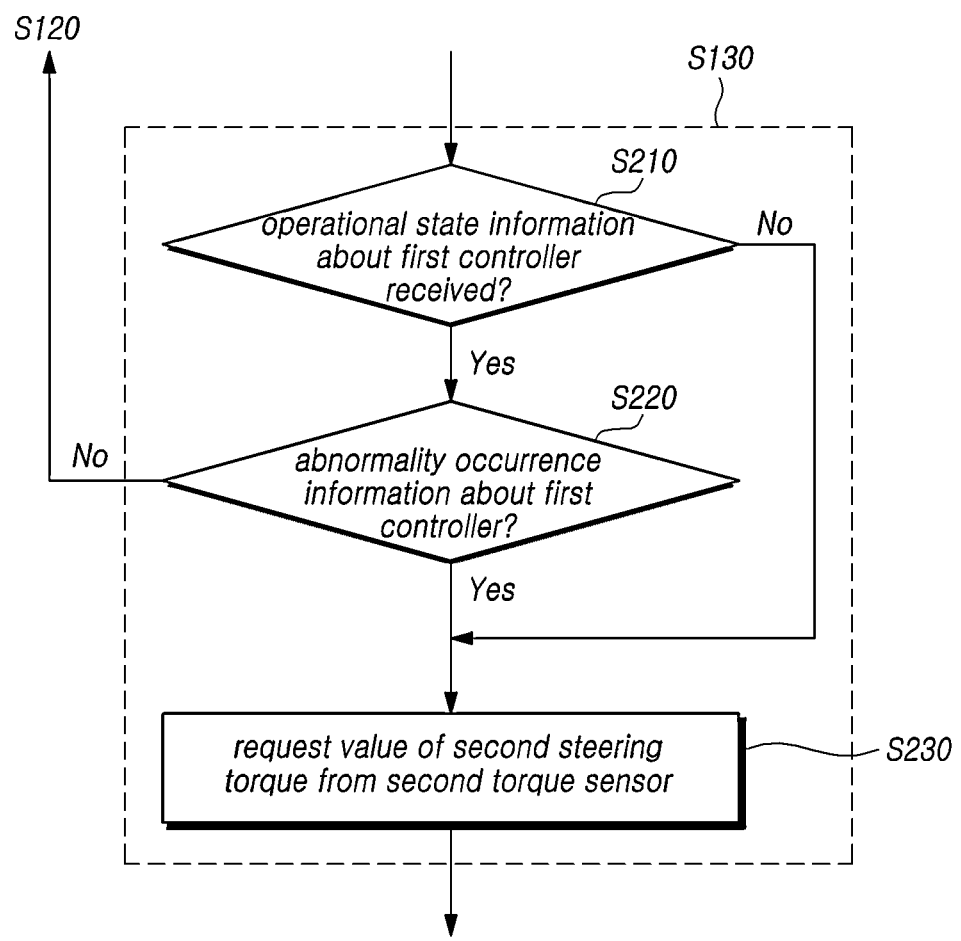
FIG. 7 is a flowchart illustrating a method for determining whether there is an abnormality in a main controller or a communication interface according to an embodiment of the disclosure.
Figure 8:
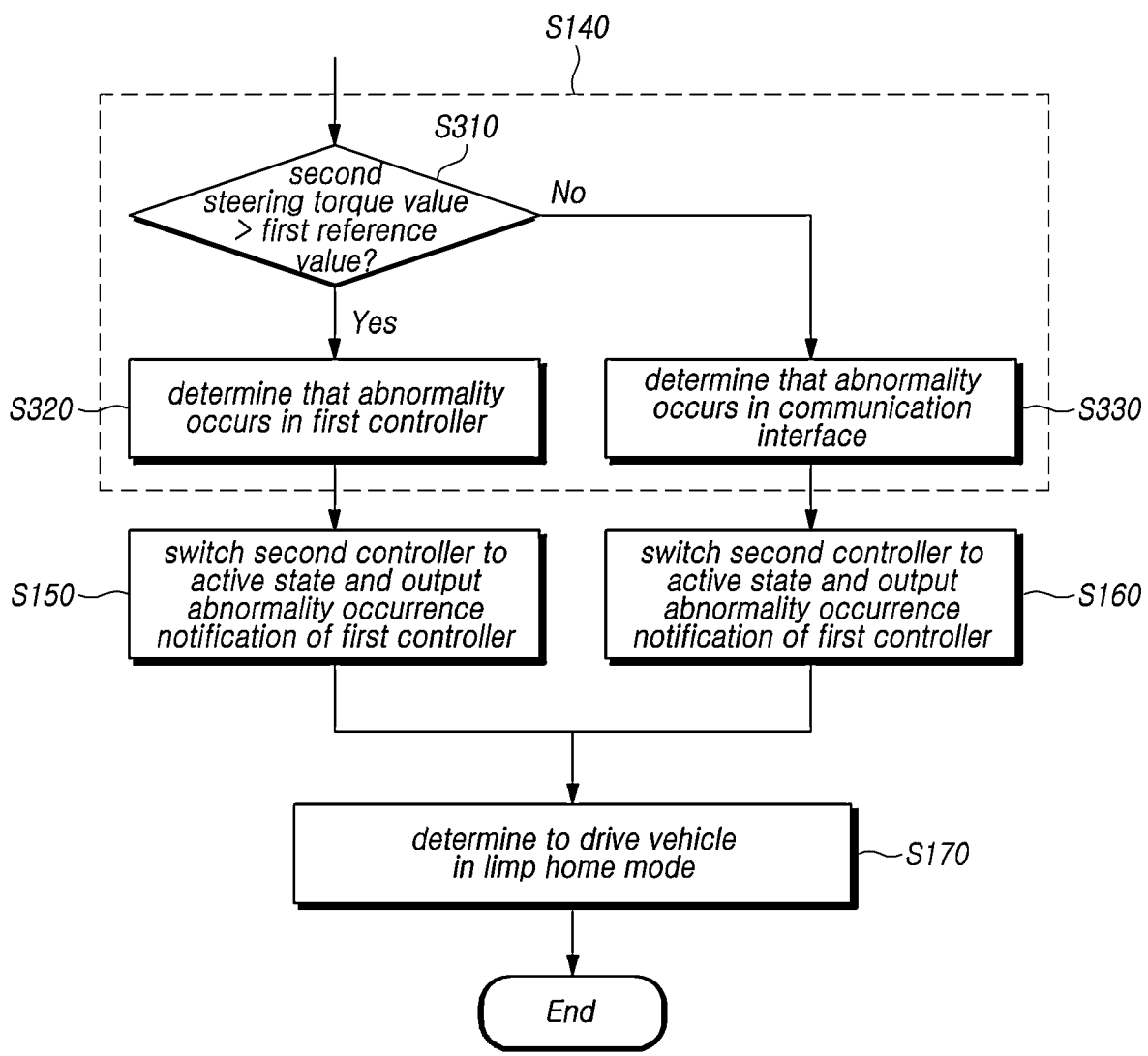
FIG. 8 is a flowchart illustrating operations when a motor to be controlled is a steering motor according to an embodiment of the disclosure.
Figure 9:
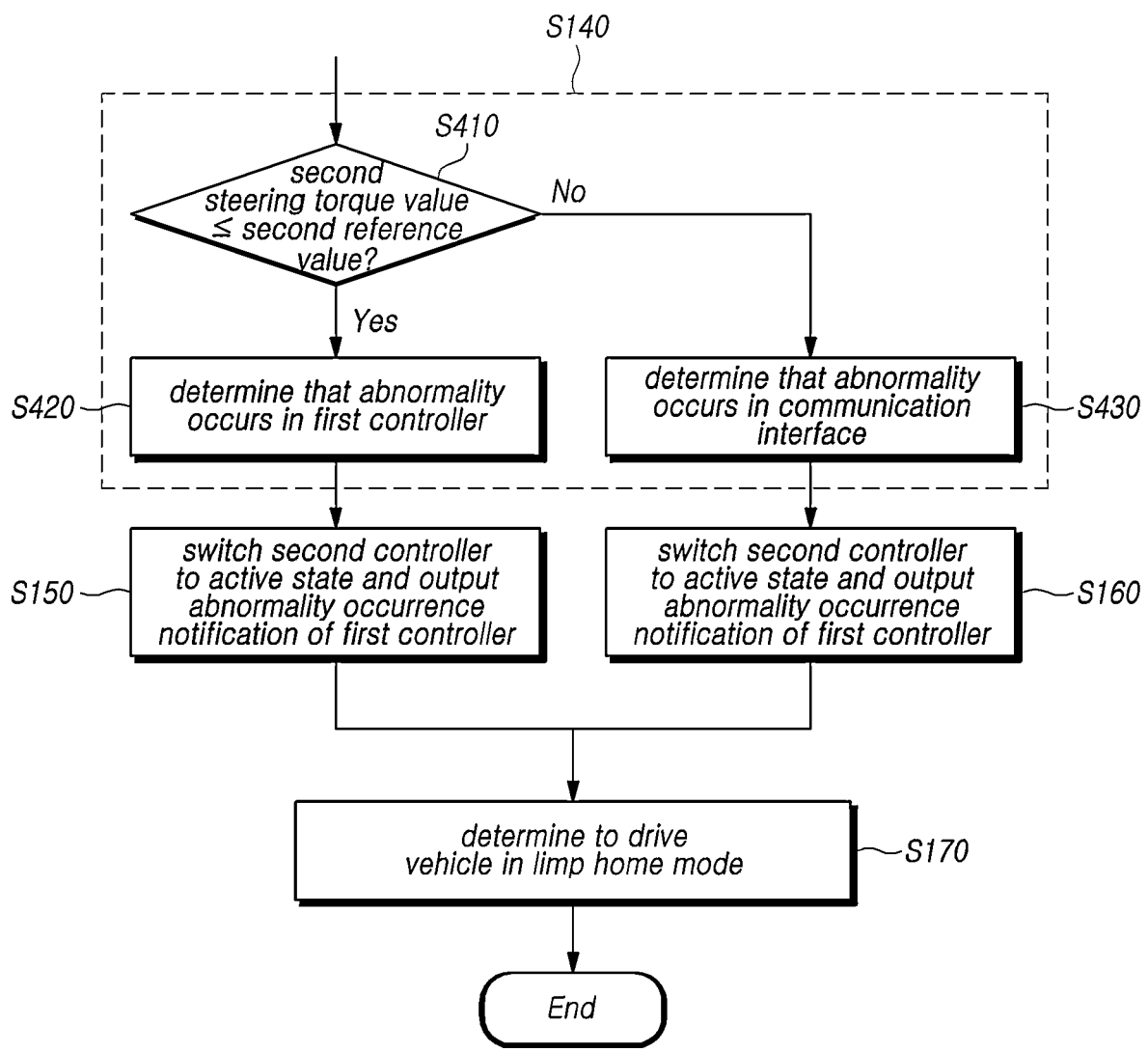
FIG. 9 is a flowchart illustrating operations when a motor to be controlled is a reaction force motor according to an embodiment of the disclosure.

FIG. 6 is a flowchart illustrating a steering control method according to an embodiment of the disclosure. FIG. 7 is a flowchart illustrating a method for determining whether there is an abnormality in a main controller or a communication interface according to an embodiment of the disclosure. FIG. 8 is a flowchart illustrating operations when a motor to be controlled is a steering motor according to an embodiment of the disclosure. FIG. 9 is a flowchart illustrating operations when a motor to be controlled is a reaction force motor according to an embodiment of the disclosure.

According to the disclosure, a steering control method may be implemented in the steering control device 100 described above with reference to FIG. 1. A steering control method and operations of a steering control device 100 for implementing the same are described below in detail with reference to necessary drawings, according to the disclosure.

Referring to FIG. 6, the first controller of the steering control device may control the motor to supply motor torque related to steering based on the value of the first steering torque detected from the first torque sensor (S110).

The first controller of the steering control device 100 may control the motor to supply a motor torque related to steering based on the inputted first steering torque information, vehicle speed information, and motor current information supplied to the motor. According to an example, assist torque or reaction force torque based on the driver's steering torque may correspond to the steering-related motor torque.

Referring back to FIG. 6, the operational state may be mutually monitored through the communication interface provided between the first controller and the second controller of the steering control device (S120).

According to an example, the first controller and the second controller of the steering control device may be configured to transmit and receive signals representing each other's operational state information to/from each other at a predetermined period through the communication interface. According to another example, each of the first controller and the second controller of the steering control device may be configured to monitor whether a normal operation is performed based on whether a signal output from a specific terminal of the counterpart is detected.

Referring back to FIG. 6, upon recognizing an occurrence of an abnormality related to the operational state of the first controller, the second controller may receive the value of the second steering torque detected from the second torque sensor (S130).

The second controller may recognize that an abnormality related to the operational state of the first controller occurs based on the signal from the first controller. Specifically, referring to FIG. 7, the second controller of the steering control device may identify whether a signal indicating operational state information about the first controller is received (S210).

When the signal indicating the operational state information about the first controller is received (Yes in S210), the second controller of the steering control device may identify whether the received signal is a signal indicating the occurrence of the abnormality in the first controller (S220). When the received signal is a signal indicating the normal state of the first controller 110 (No in S220), the second controller 120 may go back to step S120 to monitor the operational state of the first controller.

Upon failing to receive the signal indicating the operational state information about the first controller (No in S210)) or when the received signal is a signal indicating the occurrence of an abnormality in the first controller (Yes in S220), the second controller may recognize that the abnormality related to the operational state of the first controller occurs. In this case, the second controller may request and receive the second steering torque information from the second torque sensor (S230).

Referring back to FIG. 6, the second controller of the steering control device may determine whether the first controller or the communication interface has an abnormality based on the received value of the second steering torque (S140).

If the value of the second steering torque falls within the normal range, the second controller 120 may determine that an abnormality occurs in the communication interface 150. If the value of the second steering torque is not within the normal range, the second controller 120 may determine that an abnormality occurs in the first controller 110. This is described below in greater detail with reference to FIGS. 8 and 9.

FIG. 8 illustrates the operations of the steering control device when the steering assist system is a mechanical steering assist system, i.e., when the motor is a steering motor supplying assist torque.

As described above, upon recognizing an occurrence of an abnormality related to the operational state of the first controller, the second controller of the steering control device may receive the value of the second steering torque detected from the second torque sensor. The second controller may identify whether the value of the second steering torque exceeds the first reference value (S310). When the value of the second steering torque exceeds the first reference value (Yes in S310), the second controller may determine that an abnormality occurs in the first controller (S320). This is because the assist torque by the steering motor is not properly supplied.

According to an example, the first reference value may be set to a boundary value indicating a range of steering torque that may be detected when the steering motor is normally controlled to supply an appropriate assist torque. When it is determined that an abnormality occurs in the first controller, the second controller may switch the standby state to the active state and may output an abnormality occurrence notification for the first controller (S150).

The second controller may control the steering motor based on the second steering torque value and other information received from the second torque sensor. Accordingly, if an abnormality occurs in the first controller, the second controller may precisely detect the occurrence of the abnormality and control the motor to supply assist torque quickly without occurrence of LOA.

Further, the second controller may control the output unit including, e.g., a display providing visual information, a sound output unit providing audible information, or a haptic module providing tactile information, outputting an abnormality occurrence notification for the first controller.

When the value of the second steering torque is the first reference value or less (No in S310), the second controller may determine that an abnormality occurs in the communication interface (S330). This is because the assist torque by the steering motor is properly supplied so that the steering torque by the driver does not exceed the normal range. In other words, since the occurrence of an abnormality related to the operational state of the first controller is recognized even when the steering motor is normally supplying assist torque, it may be determined that an abnormality occurs in the communication interface.

In this case, since the first controller operates normally, the second controller may maintain the standby state and may output an abnormality occurrence notification for the communication interface (S160). Accordingly, it is possible to prevent such an occasion in which the second controller together with the first controller simultaneously controls the steering motor even when the communication interface fails.

When it is determined that an abnormality occurs in any one or more of the first controller or the communication interface, the second controller of the steering control device may determine to drive the vehicle in the limp home mode (S170). Accordingly, it is possible to perform safe driving even when an abnormality occurs in any one or more of the first controller or the communication interface.

FIG. 9 illustrates the operations of the steering control device when the steering assist system is a steer-by-wire system, i.e., when the motor is a reaction force motor supplying reaction force torque.

As described above in connection with FIG. 6, upon recognizing an occurrence of an abnormality related to the operational state of the first controller, the second controller of the steering control device may receive the value of the second steering torque detected from the second torque sensor. The second controller may identify whether the value of the second steering torque is the second reference value or less (S410). When the value of the second steering torque is the second reference value or less (Yes in S410), the second controller may determine that an abnormality occurs in the first controller (S420). This is because the reaction force torque by the reaction force motor is not properly supplied.

According to an example, the second reference value may be set to a boundary value indicating a range of steering torque that may be detected when the reaction force motor is normally controlled to supply an appropriate reaction force torque. When it is determined that an abnormality occurs in the first controller, the second controller may switch the standby state to the active state and may output an abnormality occurrence notification for the first controller (S150).

The second controller may control the reaction force motor based on the second steering torque value and other information received from the second torque sensor. Accordingly, if an abnormality occurs in the first controller, the second controller may precisely detect the occurrence of the abnormality and control the reaction force motor to quickly supply reaction force torque.

Further, the second controller may control the output unit including, e.g., a display providing visual information, a sound output unit providing audible information, or a haptic module providing tactile information, outputting an abnormality occurrence notification for the first controller.

When the value of the second steering torque exceeds the second reference value (No in S410), the second controller may determine that an abnormality occurs in the communication interface (S430). This is because the reaction force torque by the reaction force motor is properly supplied so that the steering torque by the driver falls within the normal range. In other words, since the occurrence of an abnormality related to the operational state of the first controller is recognized even when the reaction force motor is normally supplying reaction force torque, it may be determined that an abnormality occurs in the communication interface.

In this case, since the first controller operates normally, the second controller may maintain the standby state and may output an abnormality occurrence notification for the communication interface (S160). Accordingly, it is possible to prevent such an occasion in which the second controller together with the first controller simultaneously controls the reaction force motor even when the communication interface fails.

When it is determined that an abnormality occurs in any one or more of the first controller or the communication interface, the second controller of the steering control device may determine to drive the vehicle in the limp home mode (S170). Accordingly, it is possible to perform safe driving even when an abnormality occurs in any one or more of the first controller or the communication interface.

Accordingly, it is possible to implement a redundant safety mechanism without a separate hardware design change by determining an abnormality in the communication interface or main controller based on the steering torque value in the assistant controller upon recognizing an abnormality in the main controller provided in the steering control device and to save costs for an additional communication interface.

Figure 10:
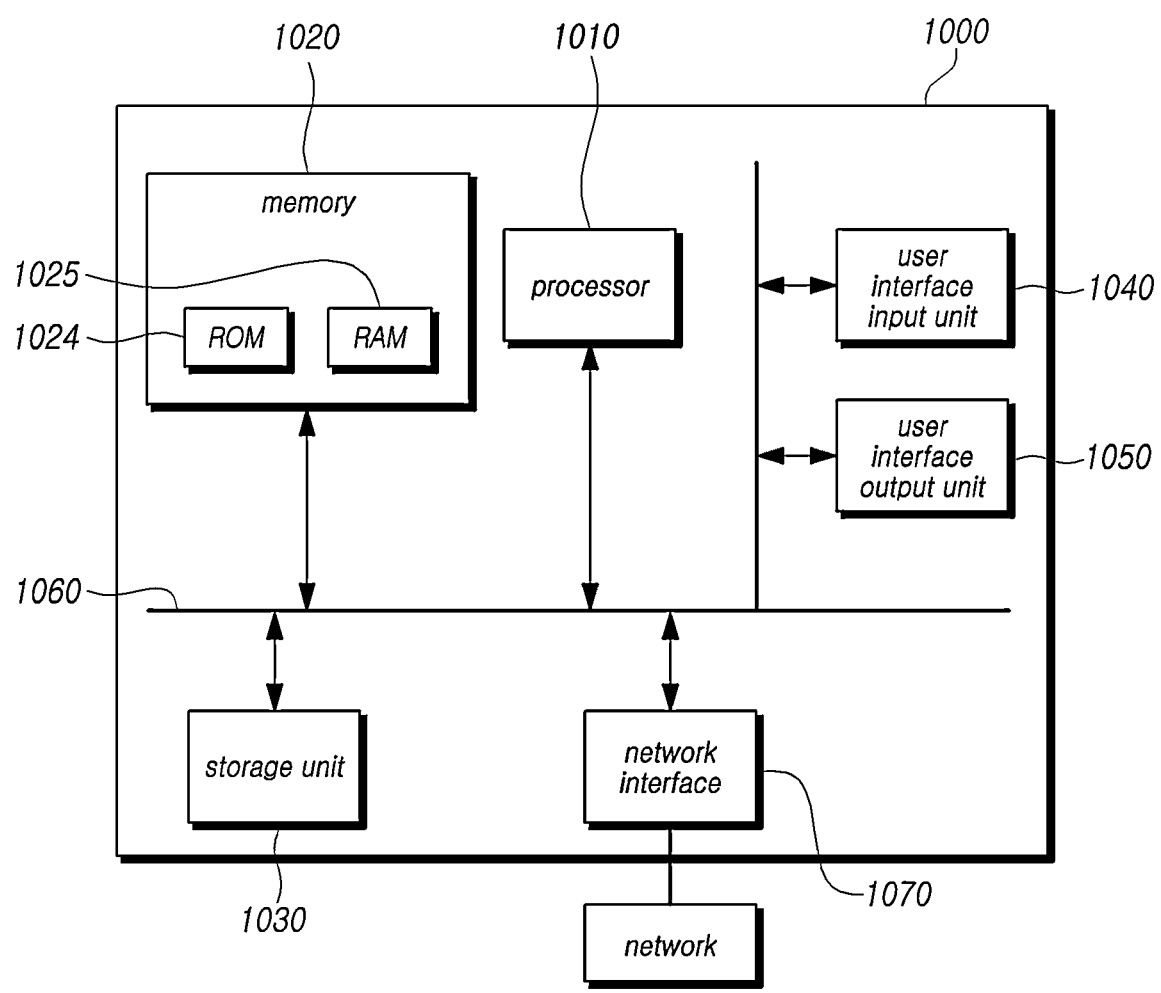
FIG. 10 is a block diagram illustrating a configuration of a computer system of a steering control device according to an embodiment of the disclosure.

FIG. 10 is a block diagram illustrating a configuration of a computer system of a steering control device according to the present embodiments.

Referring to FIG. 10, the above-described embodiments may be implemented as, e.g., a computer-readable recording medium, in a computer system. As illustrated in the drawings, the computer system 1000 of the steering control device, steering motor, and steering device may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1021 and a random access memory (RAM) 1023.

Accordingly, the embodiments may be implemented as a non-volatile computer recording medium storing computer-implemented methods or computer executable instructions.

The instructions may be executed by the processor to perform a method according to the present embodiments of the disclosure.

The above-described embodiments of the present invention may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet).

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority to Korean Patent Application No. 10-2019-0147906 filed in the Korean Intellectual Property Office on Nov. 18, 2019, the disclosure of which is incorporated by reference herein in its entirety.

The invention claimed is:

1. A steering control device, comprising:
a sensor unit including a first torque sensor and a second torque sensor each detecting a driver's steering force as a steering torque;
a first controller receiving a value of a first steering torque detected from the first torque sensor and controlling a motor to supply steering-related motor torque based on the value of the first steering torque; and
a second controller mutually monitoring an operational state through a communication interface with the first controller and controlling the motor when an abnormality occurs in the first controller,
wherein when an abnormality related to the operational state of the first controller is determined to occur, the second controller receives a value of a second steering torque detected by the second torque sensor and determines whether the abnormality is an abnormality of the communication interface or the abnormality is an abnormality of the first controller based on a comparison between at least one of a reference value and the value of the second steering torque detected by the second torque sensor.

2. The steering control device of claim 1, wherein the second controller determines that the abnormality related to the operational state of the first controller occurs when information about the operational state of the first controller is not received or abnormality occurrence information about the operational state of the first controller is received through the communication interface.

3. The steering control device of claim 1, wherein the motor is a steering motor supplying assist torque based on the driver's steering torque,
wherein the second controller determines that an abnormality occurs in the first controller when the value of the second steering torque detected by the second torque sensor exceeds a first reference value, and
wherein the first reference value is set to a boundary value for a steering torque range when the steering motor is normally controlled.

4. The steering control device of claim 3, wherein the second controller determines that the abnormality occurs in the communication interface when the value of the second steering torque detected by the second torque sensor is the first reference value or less.

5. The steering control device of claim 1, wherein if the abnormality is determined to occur in the communication interface, the second controller maintains a standby state and controls to output a notification of the abnormality occurrence in the communication interface.

6. The steering control device of claim 1, wherein if the abnormality is determined to occur in the first controller, the second controller switches to an active state and controls to output a notification of the abnormality occurrence in the first controller.

7. The steering control device of claim 1, wherein if the abnormality is determined to occur in either the first controller or the communication interface, the second controller determines to drive a vehicle in a limp home mode.

8. The steering control device of claim 1, wherein the motor is a reaction force motor supplying a reaction force torque based on the driver's steering torque,
wherein the second controller determines that an abnormality occurs in the first controller when the value of the second steering torque detected by the second torque sensor is a second reference value or less, and
wherein the second reference value is set to a boundary value for a steering torque range when the reaction force motor is normally controlled.

9. The steering control device of claim 8, wherein the second controller determines that the abnormality occurs in the communication interface when the value of the second steering torque detected by the second torque sensor exceeds the second reference value.

10. A steering control method, comprising:
controlling a motor to supply a steering-related motor torque based on a value of a first steering torque detected from a first torque sensor, by a first controller;
mutually monitoring an operational state through a communication interface by a second controller along with the first controller;
receiving a value of a second steering torque detected by a second torque sensor if an abnormality related to the operational state of the first controller is determined to occur, by the second controller; and
by the second controller, determining whether the abnormality is an abnormality of the communication interface or the abnormality is an abnormality of the first controller based on a comparison between at least one of a reference value and the value of the second steering torque detected by the second torque sensor.

11. The steering control method of claim 10, wherein receiving the value of the second steering torque detected by the second torque sensor determines that the abnormality related to the operational state of the first controller occurs when information about the operational state of the first controller is not received or abnormality occurrence information about the operational state of the first controller is received through the communication interface.

12. The steering control method of claim 10, wherein the motor is a steering motor supplying assist torque based on the driver's steering torque,
wherein determining whether the first controller or the communication interface has the abnormality determines that an abnormality occurs in the first controller when the value of the second steering torque detected by the second torque sensor exceeds a first reference value, and
wherein the first reference value is set to a boundary value for a steering torque range when the steering motor is normally controlled.

13. The steering control method of claim 12, wherein determining whether the first controller or the communication interface has the abnormality determines that the abnormality occurs in the communication interface when the value of the second steering torque detected by the second torque sensor is the first reference value or less.

14. The steering control method of claim 10, further comprising, if the abnormality is determined to occur in the communication interface, maintaining a standby state of the second controller and controlling to output a notification of the abnormality occurrence in the communication interface.

15. The steering control method of claim 10, further comprising, if the abnormality is determined to occur in the first controller, switching the second controller to an active state to control the motor and controlling to output a notification of the abnormality occurrence in the first controller.

16. The steering control device of claim 1, wherein the first torque sensor is connected to only the first controller among the first and second controllers and the second torque sensor is connected to only the second controller among the first and second controllers.

17. The steering control method of claim 10, wherein the first torque sensor is connected to only the first controller among the first and second controllers and the second torque sensor is connected to only the second controller among the first and second controllers.

* * * * *